R. W. SWIFT.
VARIABLE SPEED POWER TRANSMISSION MECHANISM.
APPLICATION FILED JUNE 17, 1908.

974,308.

Patented Nov. 1, 1910.
2 SHEETS—SHEET 1.

Witnesses
Grace E. Wynkoop.
Vina E. Mertz.

Inventor
Robert W. Swift
By Lewis E. Flanders
Attorney

THE NORRIS PETERS CO., WASHINGTON, D. C.

R. W. SWIFT.
VARIABLE SPEED POWER TRANSMISSION MECHANISM.
APPLICATION FILED JUNE 17, 1908.

974,308.

Patented Nov. 1, 1910.
2 SHEETS—SHEET 2.

Witnesses
Grace E. Wynkoop
Dina E. Mertz

Inventor
Robert W. Swift
By Lewis E. Flanders
Attorney

THE NORRIS PETERS CO., WASHINGTON, D. C.

UNITED STATES PATENT OFFICE.

ROBERT W. SWIFT, OF DETROIT, MICHIGAN.

VARIABLE-SPEED POWER-TRANSMISSION MECHANISM.

974,308.   Specification of Letters Patent.   Patented Nov. 1, 1910.

Application filed June 17, 1908. Serial No. 438,893.

*To all whom it may concern:*

Be it known that I, ROBERT W. SWIFT, a citizen of the United States, residing at Detroit, in the county of Wayne and State of Michigan, have invented certain new and useful Improvements in Variable - Speed Power-Transmission Mechanism, of which the following is a specification.

This invention relates to a variable-speed power transmission mechanism of the friction type and its object is to provide a device of this character which is so constructed as to specially adapt it for use in transmitting power to printing-presses and other devices where it is desirable to vary the speed through wide ranges and where in order to obviate the necessity for installing a larger motor than is necessary in running at ordinary speeds, it is necessary to multiply the torque of the motor in starting, or at slow speed.

A further object of the invention is to so construct such a device that when out of contact it will be impossible to throw the friction members into operative engagement in any other position than at slow speed, thus obviating the danger of over-loading the motor in starting, and, further, to provide means whereby injury to the device by bringing the friction members into contact with too great a force, is prevented.

Figure 1:
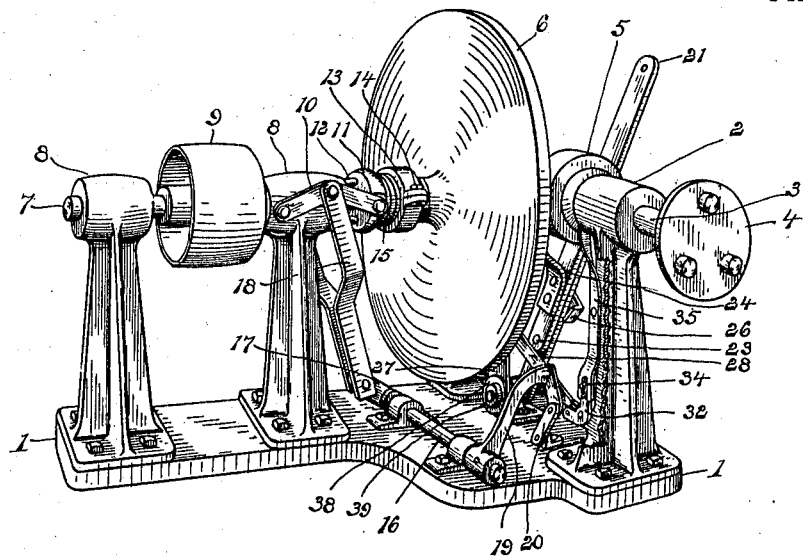
Figure 2:
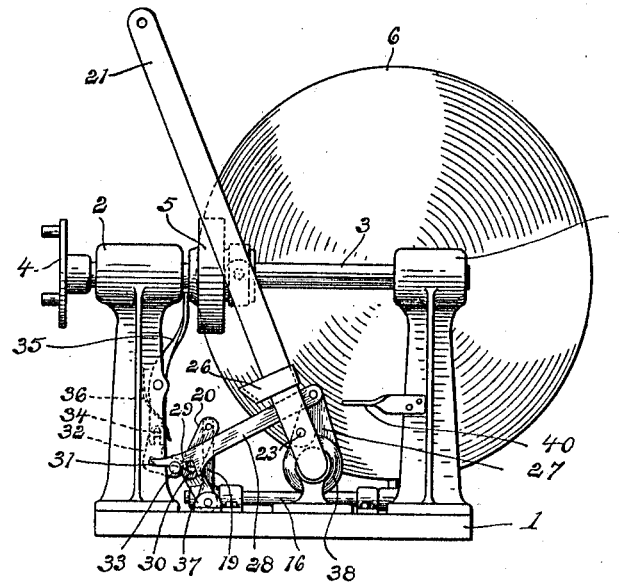
Figure 3:
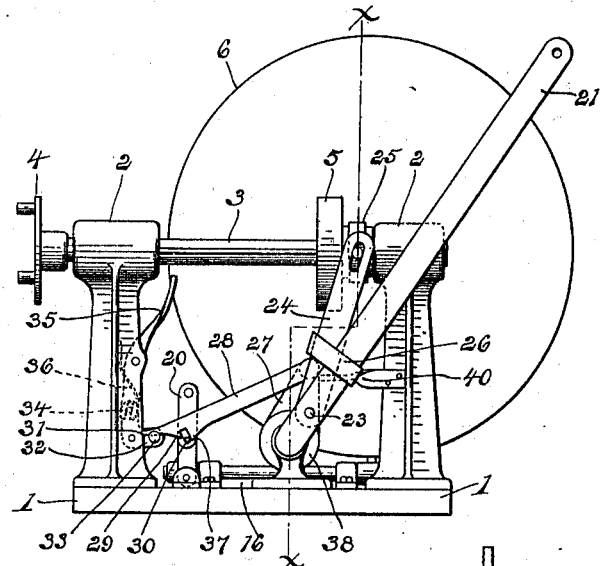
Figure 4:
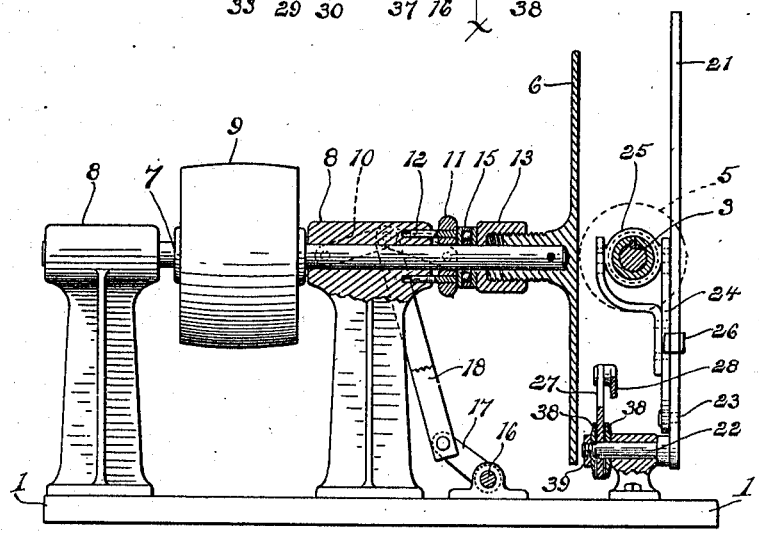
Figure 5:
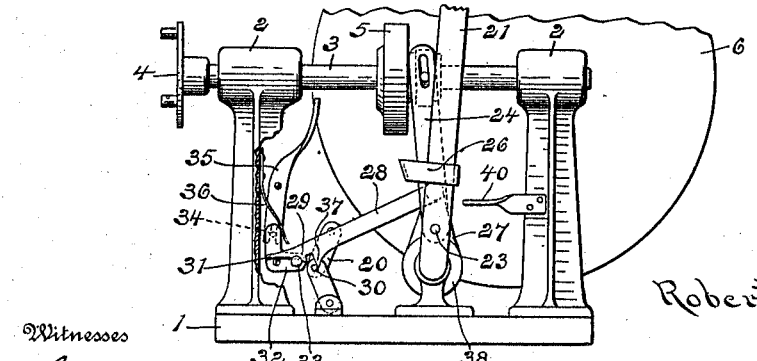

To this end the invention consists in the construction, arrangement and combination of parts substantially as shown and particularly pointed out in the claims, reference being had to the accompanying drawings in which, Figure 1 is a perspective view of a device embodying the invention; Fig. 2 is a side elevation of the same; Fig. 3 is a similar view showing the parts shifted to high-speed position; Fig. 4 is a section substantially on the line $x$—$x$ of Fig. 3; and Fig. 5 is a view similar to that of Figs. 2 and 3 and showing the parts shifted to mid-position.

As shown in the drawings 1 is a suitable base upon which are erected bearings 2—2 for a driving-shaft 3 which is provided at one end with suitable means 4 for connecting it to the driving-shaft of an electric motor, or an ordinary pulley may be substituted for said means and motion imparted to the shaft from any other source by means of a belt. Upon this shaft 3 between the bearings 2, is splined a friction-wheel 5 which is adapted to engage and transmit motion to a friction-disk 6 mounted upon a shaft 7 extending at right angles to the shaft 3 and supported in bearings 8 upon the base. The driven shaft 7 is provided with a pulley 9 adapted to be engaged by a suitable belt to transmit motion to a pulley upon the printing-press or other device to be actuated. The disk is securely pinned upon the end of its shaft and this shaft is permitted to move longitudinally a limited distance in its bearings so that the disk may be moved into and out of engagement with the friction-wheel 5.

10 are pivotally connected links pivoted at one end to the bearing 8 and at their opposite ends to the collar 11 sleeved on the shaft and prevented from rotation thereon by means of guide-pins 12 entering openings in the end of the bearing 8. The hub of the disk 6 is screw-threaded and engaging this hub is an internally screw-threaded split sleeve 13 which may be adjusted upon the hub and secured in its adjusted position by means of a bolt 14. Sleeved upon the shaft between the sleeve 13 and the collar 11 is a thrust-bearing 15 of the ordinary construction. A rock-shaft 16 is mounted in bearings upon the base and provided at one end with an arm 17 connected by means of a long, forked link 18 to the connecting pivots of the links 10 so that by turning the shaft 16 the links 10 which form a toggle will be straightened out, forcing the collar 11 away from the bearing 8 and against the thrust-bearing and thus moving the shaft and forcing the disk into frictional contact with the friction-wheel 5. On the opposite end of the rock-shaft 16 is a long arm 19 curving upwardly and forwardly past the edge of the disk and to the free end of this arm is connected a toggle 20 consisting of pivoted links with the upper end of the upper link attached to the arm 19 and the lower end of the lower link pivotally attached to a bearing on the base. The toggles 10 and 20 and the rock-shaft and levers connecting them are so arranged that when the disk is out of contact with the wheel 5, the toggle 20 is broken, and to throw the disk into contact with the pinion 5, the toggle 20 is straightened thus forcing the arm 19 upward and turning the rock-shaft.

To vary the speed at which the disk shall be driven, the friction-wheel 5 is moved longitudinally on its shaft toward the center of the disk by an operating-lever 21. This lever may be thrown by any suitable means such as a rod running to a hand-lever placed where it may be accessible to the operator or press-man. A stub-shaft 22 on the lower end of the lever 21 is mounted in a suitable bearing on the base and pivotally attached at 23 near the stub-shaft is a forked lever 24, the forked upper end of which embraces a collar 25 on the hub of the friction-wheel 5 and is pivotally attached thereto to shift the wheel on its shaft. The forked lever is free to turn on its pivot 23 upon the lever 21 a limited distance, this movement being so limited by a strap 26 attached to said lever 21 so that the said lever may move a limited distance before the strap will engage and move the forked lever.

Upon the inner end of the stub-shaft 22 is an arm 27 to the upper end of which is pivotally attached a latch-bar 28 having a hook 29 near its free end to engage a projecting stud 30 which forms the connecting pivot of the links forming the toggle 20. This latch-bar is provided at its free end with a tail-piece 31 and pivoted to any convenient support, as the standard of the bearing 2, is a bell-crank 32 provided with a stud 33 on the end of its lower arm to engage beneath the tail-piece, the upper arm of the bell-crank being provided with a pin 34 projecting through a slot in the lower end of a lever 35 which is pivoted intermediate its ends upon the standard and extends upward to a point adjacent to the shaft 3 where said end is adapted to be engaged by the friction-wheel 5 when said wheel is moved on said shaft to the outer edge of the friction-disk. A spring 36 engages the upper arm of the bell-crank and normally holds the same turned to raise the latch-bar and lift its hook out of the path of the stud 30. A downwardly extending lip 37 is provided on the latch-bar at the other side of the notch formed adjacent to the hook 29 to engage the stud 30 at the side opposite that engaged by said hook, this lip being of such a length that when the latch-bar is raised the lip will still be in line with the stud.

The arm 27 carrying the latch-bar is frictionally held from turning upon the stub-shaft 22 by means of friction-disks 38 on the shaft at each side of the arm held in frictional contact therewith by a nut 39 on the end of the shaft, said nut being capable of adjustment to vary the friction of the disks.

When the lever 21 is in the position shown in Fig. 2, the first movement of said lever will turn the arm 27 which is frictionally held thereon, and the hook of the latch-bar 28 carried by said arm being engaged with the stud 30, the toggle-lever 20 will be straightened, turning the rock-shaft 16 and operating the toggles 10 and moving the friction-disk into frictional contact with the friction-wheel. Further movement of the lever 21 brings the strap 26 into engagement with the forked lever 24, turning said lever therewith and sliding the friction-wheel 5 longitudinally on its shaft to vary the speed.

A stop 40 is provided to engage the arm 27 and limit its movement so that the toggle 20 will not be thrown past its center, the further turning of the lever 21 to move the friction-wheel to high-speed position being provided for by the frictional attachment of said arm to the stub-shaft of the lever.

When the lever 21 has been thrown to move the friction-wheel toward high-speed, a movement of said lever in the opposite direction first turns the arm 27 without moving the lever 24, because of the frictional attachment of said arm to the stub-shaft and the pivotal attachment of said forked lever to the operating-lever, and thus the toggle 20 by the engagement of the lip 37 with the stud 30 is at once broken and the friction-disk thus permitted to move out of contact with the friction-wheel, stopping the transmission of motion. As soon as this takes place, the spring 36 operates to turn the bell-crank 32 and the latch-bar is raised, moving its hook out of the path of the stud 30 so that should the operator again throw the lever 21 forward or toward the center of the disk 6, the toggle 20 will not be operated by said movement to throw the disk into contact with the friction-wheel. In order to so operate the toggle and throw the transmission members into frictional contact, it is necessary for the operator to throw the lever 21 and move the friction-wheel back to the position shown in Fig. 2 or slow speed, where it engages the upper end of the lever 35 rocking said lever on its pivot, which movement will turn the bell-crank 32 and lower the latch-bar 28 so that its hook will lie in the path of the stud 30. It will thus be seen that it is impossible for the operator to throw the disk into contact with the friction-wheel when said wheel is in any other position than slow speed, and overloading of the motor by attempting to start on high-speed is therefore effectually prevented.

The wearing away of the friction members is provided for by the sleeve 13 which is adjustable upon the hub of the disk 6 so that said disk may be adjusted toward the wheel and injury to the parts which might be caused by too great an adjustment of the disk toward the wheel, is prevented by attaching the arm 27 frictionally to the stub-shaft of the operating-lever, because if the power required to straighten the toggle 20, owing to the contact of the disk with the wheel, is greater than the frictional holding power of the friction-disks engaging the arm 27, said arm will turn upon the stub-shaft when the lever 21 is thrown, instead of turning therewith and straightening out the toggle.

Having thus fully described my invention what I claim is:—

1. In a device of the character described the combination of a driving and a driven shaft, friction members on said shafts, and means for moving said members into frictional contact comprising an operating lever connected to move one member relative to the other to vary the speed, and also comprising a member adapted to be held by said lever in position to cause said frictional members to be moved into frictional contact when said lever is moved to move said friction member toward high speed position, and to be released to permit said friction members to move out of frictional contact upon any reverse movement of said lever, and means connected to the operating lever for transmitting motion therefrom to move one member relative to the other to vary the speed.

2. A device of the character described comprising friction members, a lever for moving one member relative to the other to vary the speed, means for moving said members into frictional contact comprising a lever, and means for connecting said levers and permitting a limited relative movement thereof.

3. In a variable-speed transmission mechanism, the combination of friction members, means for controlling the transmission of motion including an operating lever and a member frictionally attached to said lever, and a lever for moving one of said friction members to vary the speed, which lever is actuated by said operating lever and has a limited movement relative thereto.

4. A device of the character described comprising frictional transmission members, and means for moving said members into frictional contact including an operating lever and a connecting member, and means for throwing said connecting member out of operative position upon movement of said lever in one direction.

5. A device of the character described comprising frictional transmission members, a lever adapted to move one member relative to the other to vary the speed, and means for moving said members into frictional contact including a connecting member, and means for controlling the operation of said connecting member adapted to be operated by one of the friction members when moved to slow speed position.

6. A device of the character described comprising friction transmission members, a lever adapted to move one member relative to the other to vary the speed, and means for moving said members into frictional contact including a member held in operative position during the moving of said lever in one direction to hold said members in frictional contact, and means for throwing said member out of operative position when said lever is moved in the opposite direction.

7. A device of the character described comprising friction transmission members, a shifting lever for shifting one member relative to the other to vary the speed, means for moving the friction members into frictional contact including an operating lever connected to the shifting lever and having a limited movement relative thereto, a connecting member connected to the operating lever, and means adapted to release said member upon the movement of said operating lever relative to the shifting lever.

8. In a variable-speed transmission mechanism, the combination of a friction disk; a friction wheel adapted to be moved across the face of the disk to vary the speed; a lever to shift said wheel; and means for moving said friction members into contact with each other including an operating lever to which the shifting lever is pivotally attached, an arm frictionally attached to the operating lever, and connecting means connecting the said means and said arm; and means for limiting the turning of the shifting lever upon the operating lever.

9. In a variable-speed transmission mechanism, the combination of a friction disk; a friction wheel adapted to be moved across the face of the disk to vary the speed; and mechanism for moving said friction members into contact with each other including an operating lever, a latch-bar connected at one end to said operating lever and having a hook at its opposite end to operate said mechanism when the lever is moved in one direction, means for lifting the latch-bar to disengage its hook when the lever is moved in the other direction, and a lever adapted to be engaged by said wheel and lower the latch when the said wheel is moved to slow-speed position.

10. In a variable-speed transmission mechanism, the combination of friction members, a lever adapted to shift one member relative to the other to vary the speed, and mechanism for moving one member into contact with the other including a toggle, an arm frictionally attached to said lever, and means connecting said arm and said toggle.

11. In a variable-speed transmission mechanism, the combination of friction members; a shifting lever to shift one member relative to the other to vary the speed; and mechanism to move one member into contact with the other embodying a toggle, an operating lever to which the shifting lever is pivotally attached and which has a limited movement relative thereto, an arm frictionally attached to said operating lever, a latch-bar pivoted at one end to said arm and detachably engaging the connecting pivot of said toggle at its opposite end, means for raising said latch-bar out of engagement with the pivot of said toggle, and means operated by the engagement of said friction member therewith for lowering said latch-bar into engagement with said pivot.

12. In a variable-speed transmission mechanism, the combination of a friction disk, a friction wheel adapted to be moved across the face of the disk to vary the speed, mechanism for moving the disk into contact with the wheel embodying a toggle, an operating-lever to shift said wheel, a latch-bar connected to said lever to be moved thereby and provided with a hook to engage the toggle and operate the same when the lever is moved in one direction, means engaging said latch-bar to raise its hook out of engagement with the toggle upon the movement of the lever in the opposite direction, and a lever to operate said means to lower the hook into engagement with the toggle, said lever being adapted to be operated by the engagement therewith of said wheel when moved to slow-speed position.

13. In a variable-speed transmission mechanism, the combination of a friction disk, a friction wheel adapted to be moved across the face of the disk to vary the speed, mechanism for moving the disk into contact with the wheel, said mechanism embodying a toggle, a stud forming the connecting pivot of the toggle, an operating-lever, an arm carried by the operating-lever, a latch-bar pivoted to said arm at one end and formed with a hook at its opposite end to engage one side of the said stud and with a tail-piece adjacent to the hook, means engaging the tail-piece to lift the hook out of engagement with the stud, a lever actuated by the operating-lever to shift the wheel, and a lever engaged by the wheel when shifted to slow-speed position to turn said means for lifting the latch-bar and permit said bar to engage the stud.

14. In a variable-speed transmission mechanism, the combination of a friction disk, a friction wheel adapted to be moved across the face of the disk to vary the speed, mechanism to move the disk into contact with the wheel and embodying a toggle for operating the same, a stud forming the connecting pivot of the toggle, an operating-lever, an arm frictionally attached to said lever, a stop to limit the turning of said arm, a latch-bar pivotally attached to said arm at one end and provided with a hook at its opposite end to engage one side of the stud and with an extended lip to engage the other side of said stud, and means for lifting the latch-bar to disengage the hook from the stud.

15. In a variable-speed transmission mechanism, the combination of a friction disk, a friction wheel adapted to be moved across the face of the disk to vary the speed, means for moving said disk into contact with said wheel, a rock-shaft for transmitting motion to operate said means, an arm on said rock-shaft, a toggle attached to said arm to raise the same and turn the shaft, a stud forming the connecting pivot of said toggle, an operating-lever, an arm on said lever, a latch-bar attached at one end to said arm and having a hook and a tail-piece at its opposite end, a bell-crank having a stud engaging beneath the tail-piece, a spring to turn the bell-crank and lift the latch, means for shifting the wheel by the movement of the lever, and a lever pivoted intermediate its ends with one end extending into the path of the wheel when shifted upon its shaft and engaging the bell-crank at its opposite end to turn the same.

16. In a variable-speed transmission mechanism, the combination with a driving shaft and a driven shaft, of a friction disk upon one shaft and a friction wheel upon the other shaft, a bearing for one of the shafts adjacent to one of said friction members, a collar on said shaft between the bearing and hub of said member, guide pins on said collar engaging openings in the bearing, a toggle consisting of pivotally connected links pivoted at one end to the bearing and at the other end to the collar, a link pivotally attached to the pivot connection of the toggle links, and means for moving said link to operate the toggle.

17. In a variable-speed transmission mechanism, the combination with a driving and a driven shaft, of a friction member on each of said shafts adapted to transmit motion from one shaft to the other, a bearing for one of said shafts adjacent to the friction member thereon, an externally screw-threaded hub on said member, an internally screw-threaded sleeve on said hub, means for holding the sleeve in adjusted position upon the hub, a thrust-bearing engaging the end of the adjusting sleeve, a collar on the shaft at the other side of the thrust-bearing, guide pins on said collar engaging openings in the shaft bearing, a toggle pivoted at one end to the shaft bearing and at the other end to the collar, a link attached to the toggle, an operating-lever, an arm frictionally attached to the operating-lever, and means for transmitting motion from said arm to said link.

18. In a variable-speed transmission mechanism, the combination of a driving shaft, a friction wheel splined upon said shaft, a driven shaft extending at right angles to the driving shaft, a disk upon the driven shaft, a toggle for moving the disk into contact with the wheel, a link for operating the toggle, a rock-shaft, an arm on the rock-shaft pivotally attached to the link, a long arm on the opposite end of the rock-shaft, a toggle attached to said long arm to raise the same and turn the shaft, a stud forming the connecting pivot of said toggle, an operating-lever, a stub-shaft forming the pivot of said lever, an arm frictionally attached to said stub-shaft, a latch-bar pivotally attached at one end to said arm and having a hook at the opposite end to engage the stud at one side and an extended lip to engage the stud at its opposite side, a tail-piece on said latch-bar adjacent to the hook, a bell-crank having a stud engaging beneath said tail-piece, a spring to turn the bell-crank, a forked lever pivotally connected at one end to the operating-lever and attached at its forked end to the hub of said friction wheel to shift the same, a strap on the operating-lever to engage and limit the turning of the forked lever relative to the operating-lever, and a lever pivoted intermediate its ends with one end extending in the path of said wheel when shifted to change the speed and the opposite end of said lever being attached to the bell-crank to turn the same against the action of its spring.

In testimony whereof I have affixed my signature in presence of two witnesses.

ROBERT W. SWIFT.

Witnesses:
   VINA E. MERTZ,
   LEWIS E. FLANDERS.